United States Patent
Lee et al.

(10) Patent No.: US 10,956,141 B2
(45) Date of Patent: Mar. 23, 2021

(54) SECURE ELEMENT MANAGEMENT AND ELECTRONIC DEVICE PERFORMING SAME AND INSTALLATION PACKAGE

(71) Applicant: Samsung Electronics Co., Ltd., Suwon-si (KR)

(72) Inventors: Taeck Ki Lee, Siheung-si (KR); Dae Haeng Cho, Suwon-si (KR); Eun Young Kwon, Seoul (KR); Jong Su Kim, Suwon-si (KR); Da Som Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/466,906

(22) PCT Filed: Nov. 20, 2017

(86) PCT No.: PCT/KR2017/013206
§ 371 (c)(1),
(2) Date: Jun. 5, 2019

(87) PCT Pub. No.: WO2018/105924
PCT Pub. Date: Jun. 14, 2018

(65) Prior Publication Data
US 2020/0065081 A1    Feb. 27, 2020

(30) Foreign Application Priority Data

Dec. 7, 2016   (KR) .......................... 10-2016-0165791

(51) Int. Cl.
*G06F 9/445*    (2018.01)
*G06F 8/61*    (2018.01)
(Continued)

(52) U.S. Cl.
CPC ............ *G06F 8/61* (2013.01); *G06F 21/6245* (2013.01); *G06Q 20/4018* (2013.01)

(58) Field of Classification Search
CPC .... G06F 8/61; G06F 21/6245; G06Q 20/4018
(Continued)

(56) References Cited

U.S. PATENT DOCUMENTS 6,606,744 B1 *   8/2003   Mikurak ................. H04L 29/06
                                                  717/174
7,095,854 B1 *   8/2006   Ginter ..................... G06F 21/10
                                                  380/231
(Continued)

FOREIGN PATENT DOCUMENTS

EP       3038394 A1      6/2016
KR       10-100630 A     6/2009
(Continued)

OTHER PUBLICATIONS

Heiner et al, "Secure Software Installation in a Mobile Environment", ACM, pp. 155-156 (Year: 2007).*
(Continued)

*Primary Examiner* — Anil Khatri
(74) *Attorney, Agent, or Firm* — Jefferson IP Law, LLP

(57) ABSTRACT

An electronic device includes a secure element in which at least one application package is installed and a processor for communicating with the secure element. The secure element further stores a list with which a part or all of identification information of the at least one application package is registered. The processor controls the secure element such that an application package indicated by the identification information registered with the list is uninstalled, in response to a specified event. Various other embodiments recognized from the specification are also possible.

15 Claims, 9 Drawing Sheets

(51) Int. Cl.
*G06F 21/62* (2013.01)
*G06Q 20/40* (2012.01)

(58) Field of Classification Search
USPC .................................................. 717/168–177
See application file for complete search history.

(56) References Cited

U.S. PATENT DOCUMENTS

| | | | |
|---|---|---|---|
| 8,171,525 B1* | 5/2012 | Pelly | H04W 12/00409 726/2 |
| 8,196,131 B1* | 6/2012 | von Behren | G06Q 20/3563 717/168 |
| 8,255,687 B1* | 8/2012 | Pelly | H04W 12/0023 713/164 |
| 8,335,921 B2* | 12/2012 | von Behren | G06Q 20/3552 713/164 |
| 8,335,932 B2 | 12/2012 | Von Behren et al. | |
| 8,352,749 B2 | 1/2013 | Von Behren et al. | |
| 8,543,931 B2* | 9/2013 | Forstall | G06F 9/451 715/762 |
| 8,549,586 B2* | 10/2013 | Mendel | G06F 21/00 726/4 |
| 8,639,625 B1* | 1/2014 | Ginter | G06F 21/51 705/51 |
| 8,646,059 B1* | 2/2014 | von Behren | G06Q 20/3574 726/9 |
| 8,793,508 B2 | 7/2014 | Von Behren et al. | |
| 8,875,228 B2 | 10/2014 | Gargiulo et al. | |
| 8,943,494 B2* | 1/2015 | Lemonnier | H04L 67/06 717/174 |
| 9,098,270 B1 | 8/2015 | Tiyyagura et al. | |
| 9,104,887 B2 | 8/2015 | Gargiulo | |
| 9,323,945 B2* | 4/2016 | Gargiulo | G06F 8/61 |
| 9,324,206 B2 | 4/2016 | Saarisalo | |
| 9,424,413 B2* | 8/2016 | Hammad | G06F 21/34 |
| 9,436,455 B2* | 9/2016 | Ziat | G06F 8/65 |
| 9,473,932 B2 | 10/2016 | Lessiak et al. | |
| 9,479,571 B2 | 10/2016 | Gargiulo | |
| 9,544,759 B2 | 1/2017 | Gargiulo | |
| 9,572,025 B2* | 2/2017 | Arvidsson | H04W 12/02 |
| 9,578,063 B1* | 2/2017 | Iyer | H04L 63/102 |
| 9,582,267 B2* | 2/2017 | Aabye | H04W 12/0023 |
| 10,223,096 B2* | 3/2019 | Ziat | H04L 63/0815 |
| 2011/0239304 A1 | 9/2011 | Saarisalo | |
| 2012/0159148 A1 | 6/2012 | Behren et al. | |
| 2012/0159163 A1 | 6/2012 | Von Behren et al. | |
| 2013/0111546 A1 | 5/2013 | Gargiulo et al. | |
| 2013/0111599 A1 | 5/2013 | Gargiulo | |
| 2013/0121493 A1 | 5/2013 | Von Behren et al. | |
| 2014/0047235 A1 | 2/2014 | Lessiak et al. | |
| 2014/0082056 A1 | 3/2014 | Gargiulo | |
| 2014/0164475 A1 | 6/2014 | Gargiulo | |
| 2015/0007345 A1 | 1/2015 | Gargiulo et al. | |
| 2015/0193224 A1* | 7/2015 | Ziat | G06F 8/65 717/172 |
| 2015/0310223 A1 | 10/2015 | Gargiulo | |
| 2016/0196450 A1 | 7/2016 | Gargiulo et al. | |
| 2016/0203450 A1 | 7/2016 | Saarisalo | |
| 2016/0247144 A1 | 8/2016 | Oh et al. | |
| 2016/0253651 A1 | 9/2016 | Park et al. | |
| 2016/0253652 A1 | 9/2016 | Je et al. | |
| 2016/0253657 A1 | 9/2016 | Sohn et al. | |
| 2016/0253664 A1 | 9/2016 | Yuan et al. | |
| 2016/0253666 A1 | 9/2016 | Lee et al. | |
| 2016/0253669 A1 | 9/2016 | Yoon et al. | |
| 2016/0253670 A1 | 9/2016 | Kim et al. | |
| 2016/0254918 A1 | 9/2016 | Liu et al. | |
| 2017/0017956 A1 | 1/2017 | Gargiulo | |
| 2017/0019792 A1 | 1/2017 | Gargiulo | |
| 2017/0061436 A1 | 3/2017 | Liu et al. | |
| 2017/0061437 A1 | 3/2017 | Peng et al. | |
| 2017/0213051 A1 | 7/2017 | Gargiulo | |
| 2017/0337542 A1 | 11/2017 | Kim et al. | |
| 2018/0018461 A1 | 1/2018 | Shin et al. | |
| 2018/0107840 A1 | 4/2018 | Boulanger et al. | |

FOREIGN PATENT DOCUMENTS

| | | |
|---|---|---|
| KR | 10-2013-0100351 A | 9/2013 |
| KR | 10-2014-0075602 A | 6/2014 |
| KR | 10-2015-0011000 A | 1/2015 |
| KR | 10-2016-0105279 A | 9/2016 |
| KR | 10-2016-0112316 A | 9/2016 |

OTHER PUBLICATIONS

Roesner et al, "User Interface Toolkit Mechanisms for Securing Interface Elements", ACM, pp. 239-249 (Year: 2012).*

Barrers et al, "Secure Software Installation on Smartphones" IEEE, pp. 42-48 (Year: 2011).*

Roland et al, "Practical Attack Scenarios on Secure element-enabled Mobile Devices", IEEE, pp. 19-24 (Year: 2012).*

Vasquez et al, "Mobile Application Monitoring", IEEE, pp. 30-32 (Year: 2015).*

Marques et al, "Secure deduplication on mobile devices", ACM, pp. 19-25 (Year: 2011).*

Kuaté et al, "Secure Asynchronous Communication for Mobile Devices", ACM, pp. 5-8 (Year: 2009).*

Suomalainen et al, "Secure Information Sharing between Heterogeneous Embedded Devices", ACM, pp. 205-212 (Year: 2010).*

* cited by examiner

SECURE ELEMENT MANAGEMENT AND ELECTRONIC DEVICE PERFORMING SAME AND INSTALLATION PACKAGE

TECHNICAL FIELD

The disclosure relates to a method for managing a secure element and an electronic device for performing the same.

BACKGROUND ART

For a mobile payment transaction using an electronic device, the electronic device may store very sensitive, private information, for example, card information of a user. Thus, a secure element to which a higher security policy that a general memory is applied may be loaded into the electronic device The secure element may be managed based on communication with a remote entity such as a trusted service manager (TSM) for secure data management. The secure element and the TSM may perform predetermined encryption communication using an encryption key shared in advance. Various data and information stored in the secure element may be added, removed, or modify based on the encryption communication.

DISCLOSURE

Technical Problem

In a use case, a user may attempt to perform a factory reset for a smartphone into which a secure element is loaded for various purposes. However, when uninstalling or removing data or the like (e.g., an application or an applet) which are provided from several TSMs and are stored in the secure element, the secure element should perform encryption communication with all the TSMs. Such a process may be long in data communication and processing time. Furthermore, because the secure element should perform the encryption communication with all the TSMs, the user may feel uncomfortable.

Various embodiments disclosed in the disclosure are to provide an electronic device for addressing the above-mentioned problems and issues raised in the disclosure.

Technical Solution

In accordance with an aspect of the disclosure, an electronic device is provided. The electronic device may include a processor, a communication circuitry configured to establish communication with a server, and a secure element. The processor may be configured to receive at least one application package from the server via the communication circuitry, install the at least one application package in the secure element, and store a list with which a part or all of identification information of the at least one application package is registered in the secure element.

In accordance with another aspect of the disclosure, an electronic device is provided. The electronic device may include a secure element configured such that at least one application package is installed and a processor configured to communicate with the secure element. The secure element may further store a list with which a part or all of identification information of the at least one application package is registered. The processor may be configured to control the secure element such that an application package indicated by the identification information registered with the list is uninstalled, in response to a specified event.

Advantageous Effects

According to embodiments disclosed in the disclosure, an electronic device may collectively remove a variety of data in a secure element without communication with a server. As a result, a time taken to remove all of data stored in the secure element and communication traffic may be reduced.

MODE FOR INVENTION

Figure 1:
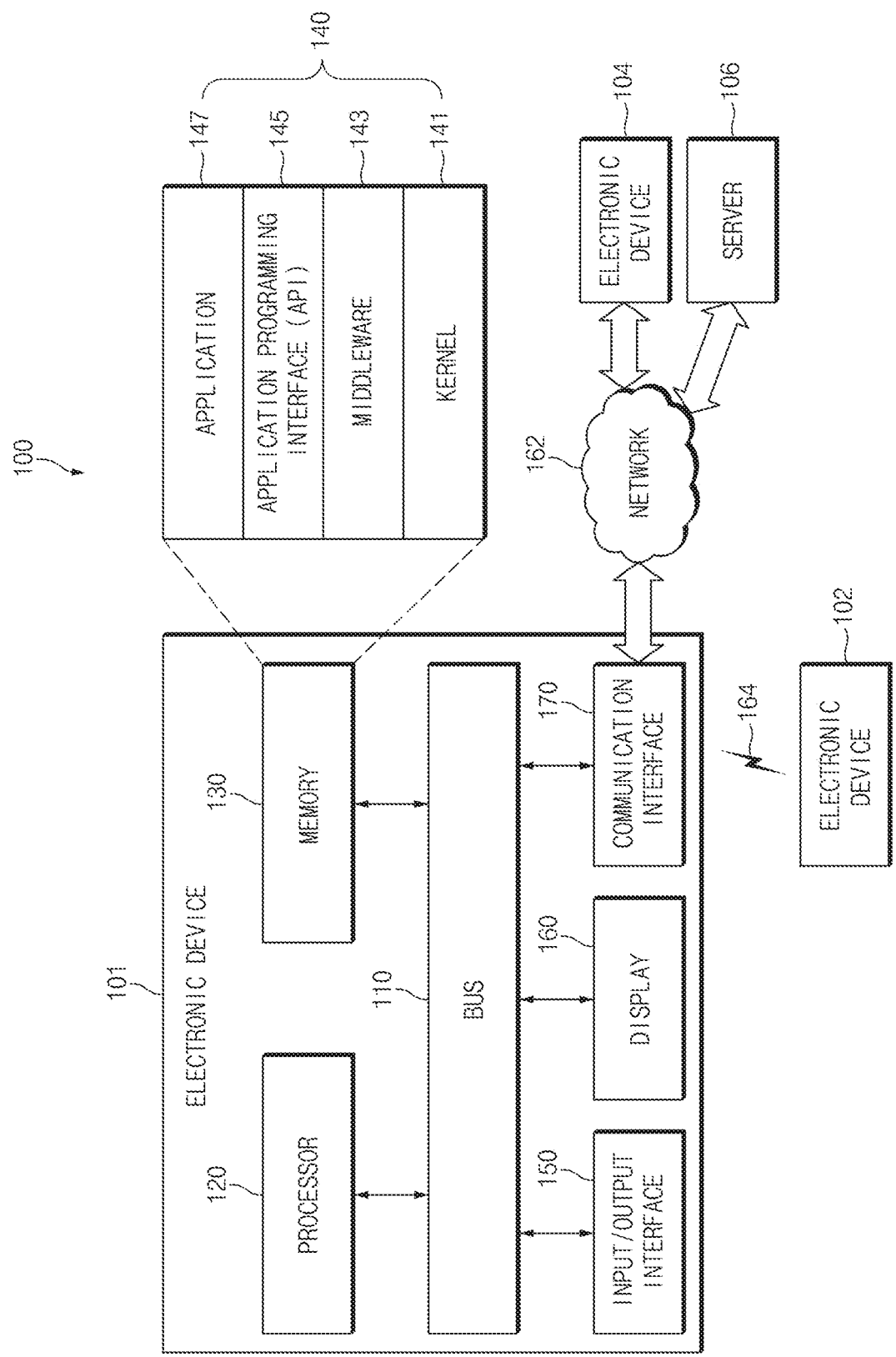
FIG. 1 illustrates an electronic device according to various embodiments.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 illustrates an electronic device in a network environment system, according to various embodiments.

Referring to FIG. 1, according to various embodiments, an electronic device 101, 102, or 104, or a server 106 may be connected each other over a network 162 or a short range communication 164. The electronic device 101 may include a bus 110, a processor 120, a memory 130, an input/output interface 150, a display 160, and a communication interface 170. According to an embodiment, the electronic device 101 may not include at least one of the above-described components or may further include other component(s).

For example, the bus 110 may interconnect the above-described components 110 to 170 and may include a circuit for conveying communications (e.g., a control message and/or data) among the above-described components.

The processor 120 may include one or more of a central processing unit (CPU), an application processor (AP), or a communication processor (CP). For example, the processor 120 may perform an arithmetic operation or data processing associated with control and/or communication of at least other components of the electronic device 101.

The memory 130 may include a volatile and/or nonvolatile memory. For example, the memory 130 may store commands or data associated with at least one other component(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources.

The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits a command or data input from a user or another external device, to other component(s) of the electronic device 101. Furthermore, the input/output interface 150 may output a command or data, received from other component(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first external electronic device 102, the second external electronic device 104, or the server 106). For example, the communication interface 170 may be connected to the network 162 over wireless communication or wired communication to communicate with the external device (e.g., the second external electronic device 104 or the server 106).

The wireless communication may include cellular communication using at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. According to an embodiment, the wireless communication may include, for example, at least one of wireless fidelity (Wi-Fi), Bluetooth, Bluetooth low energy (BLE), Zigbee, near field communication (NFC), magnetic secure transmission, magnetic stripe transmission, radio frequency (RF), body area network (BAN), a global navigation satellite system (GNSS), or the like.

The magnetic secure transmission or magnetic stripe transmission may generate a pulse in response to transmission data, and the pulse may generate a magnetic field signal. The electronic device 101 may transfer the magnetic field signal to point of sale (POS) The POS may detect the magnetic field signal using a MSR (magnetic stripe reader or magnetic secure reader), may recover the data by converting the detected magnetic field signal to an electrical signal. In the disclosure, "MST" may be used to refer to magnetic secure transmission or magnetic stripe transmission.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second electronic devices 102 and 104 may be a device of which the type is different from or the same as that of the electronic device 101. According to an embodiment, the server 106 may include a group of one or more servers.

According to various embodiments, the server 106 may include a mobile payment service server for implementing a mobile payment service in the electronic device 101 and/or a payment server of a card company (and/or a financial institution). For example, the mobile payment service server may include a server (e.g., a token service provider (TSP) server) which manages a token associated with a payment application. Furthermore, for example, the payment server of the card company (and/or the financial institution) may include a server (e.g., a trusted service manager (TSM) server) which manages card information of a user.

According to an embodiment, the mobile payment service server may provide payment information (e.g., a one-time token (OTT)) to the electronic device 101 for each payment transaction by interacting with the payment server of the card company (and/or the financial institution). The electronic device 101 may perform specified secure authentication and may transmit the provided payment information to the external device 102 or 104 (e.g., a POS terminal) over various channels (e.g., an MST channel, an NFC channel, and the like). The external device 102 or 104 may transmit the payment information to the payment server of the card company (and/or the financial institution) again and may obtain payment approval to complete the corresponding payment transaction.

According to an embodiment, a secure authentication policy applied to various payment cards may be determined by the card company and/or the financial institution (an example of a card issuer). Information (or data) including the secure authentication policy of the various payment cards may be transmitted to the electronic device 101 by the mobile payment service server and/or the card company (and/or the financial institution).

According to various embodiments, all or a portion of operations that the electronic device 101 will perform may be executed by another or plural electronic devices (e.g., the electronic device 102 or 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from another device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
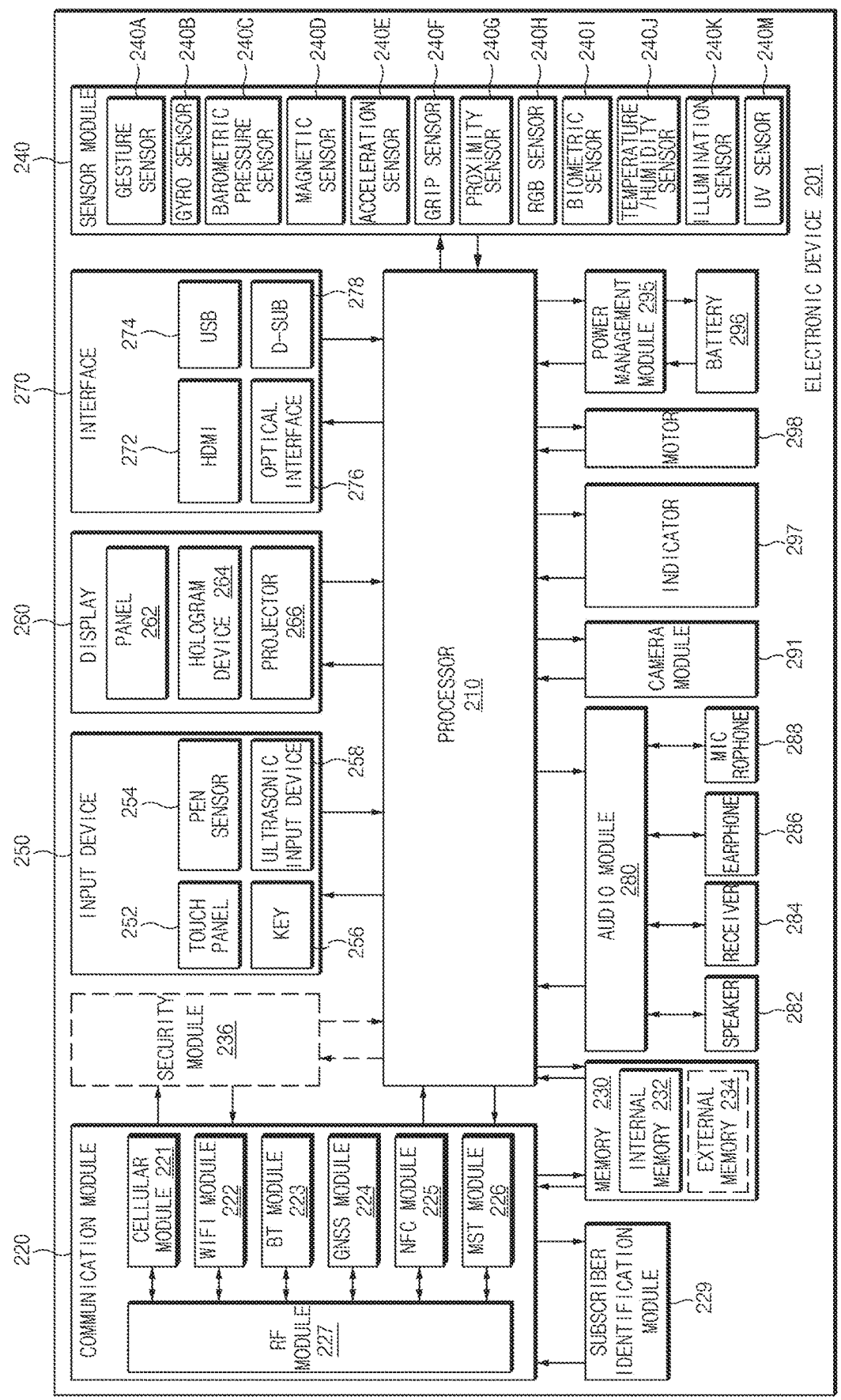
FIG. 2 illustrates a block diagram of an electronic device according to various embodiments; NOM

FIG. 2 illustrates a block diagram of an electronic device, according to various embodiments.

Referring to FIG. 2, an electronic device 201 may include, for example, all or a part of the electronic device 101 illustrated in FIG. 1. The electronic device 201 may include one or more processors (e.g., an application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system (OS) or an application to control a plurality of hardware or software components connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of components illustrated in FIG. 2. The processor 210 may load a command or data, which is received from at least one of other components (e.g., a nonvolatile memory), into a volatile memory and process the loaded command or data. The processor 210 may store a variety of data in the nonvolatile memory.

The communication module 220 may be configured the same as or similar to the communication interface 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226 and a radio frequency (RF) module 227.

The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 229. According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, or the MST module 226 may be included within one Integrated Circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on java card open platform (JCOP) OS.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or alternatively, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, or the like. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. For example, the screen may be arranged in the inside or the outside of the electronic device 201. According to an embodiment, the panel 262 may include a pressure sensor (or force sensor, interchangeably used hereinafter) that measures the intensity of touch pressure by a user. The pressure sensor may be implemented integrally with the touch panel 252, or may be implemented as at least one sensor separately from the touch panel 252. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 170 illustrated in FIG. 1. Additionally or alternatively, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a component of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 3:
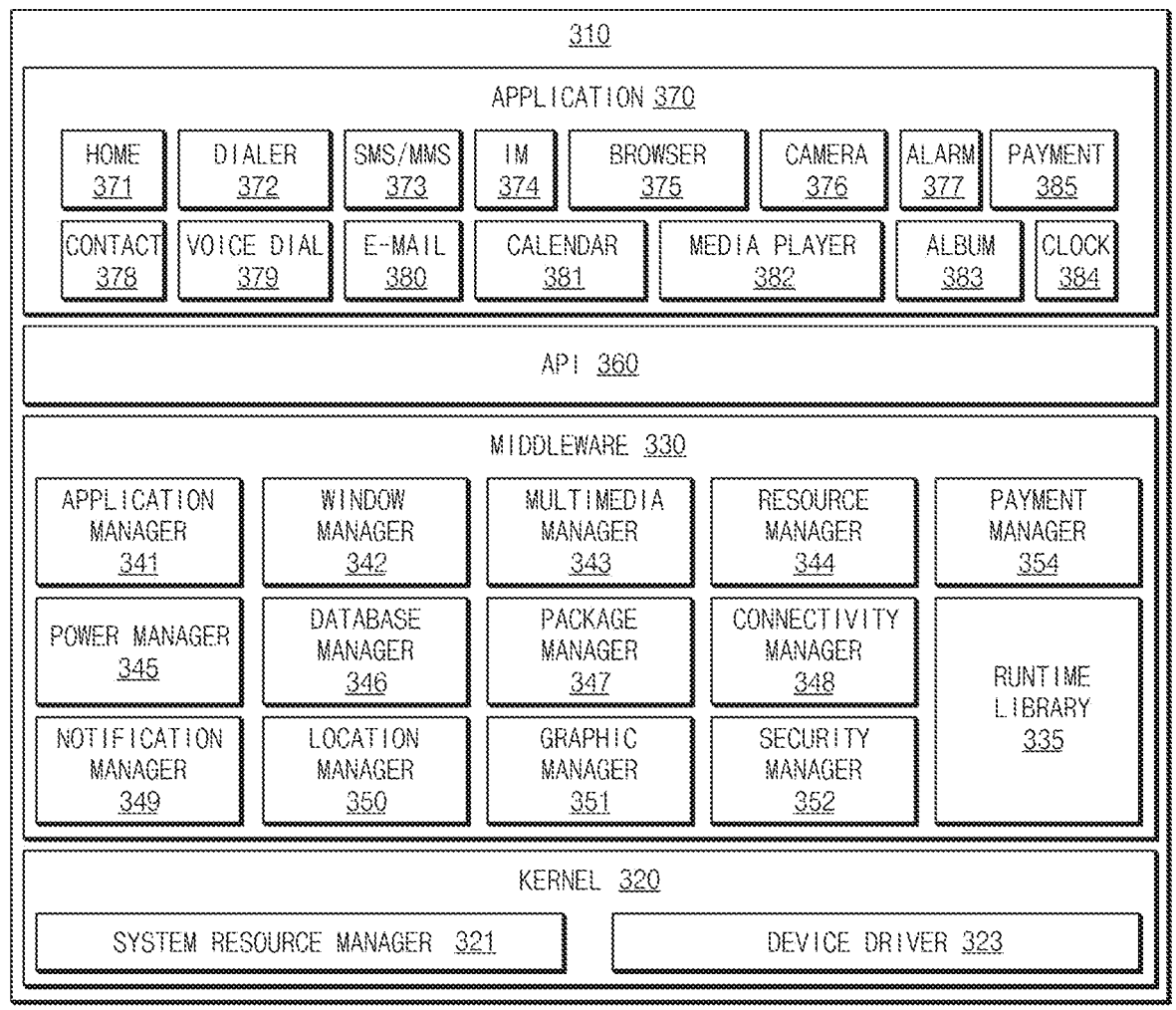
FIG. 3 illustrates a block diagram of a program module according to various embodiments.

FIG. 3 illustrates a block diagram of a program module, according to various embodiments.

According to an embodiment, a program module 310 (e.g., the program 140) may include an operating system (OS) to control resources associated with an electronic device (e.g., the electronic device 101), and/or diverse applications (e.g., the application program 147) driven on the OS. The OS may be, for example, Android, iOS, Windows, Symbian, Tizen, or Bada.

The program module 310 may include a kernel 320, a middleware 330, an application programming interface (API) 360, and/or an application 370. At least a portion of the program module 310 may be preloaded on an electronic device or may be downloadable from an external electronic device (e.g., the electronic device 102 or 104, the server 106, or the like).

The kernel 320 (e.g., the kernel 141) may include, for example, a system resource manager 321 or a device driver 323. The system resource manager 321 may perform control, allocation, or retrieval of system resources. According to an embodiment, the system resource manager 321 may include a process managing unit, a memory managing unit, or a file system managing unit. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager 354.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify database that is to be used in at least one application of the application 370. The package manager 347 may install or update an application that is distributed in the form of package file.

The connectivity manager 348 may manage, for example, wireless connection such as Wi-Fi or Bluetooth. The notification manager 349 may display or notify an event such as arrival message, appointment, or proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function necessary for system security, user authentication, or the like. According to an embodiment, in the case where an electronic device (e.g., the electronic device 101) includes a telephony function, the middleware 330 may further include a telephony manager for managing a voice or video call function of the electronic device.

The middleware 330 may include a middleware module that combines diverse functions of the above-described components. The middleware 330 may provide a module specialized to each OS kind to provide differentiated functions. Additionally, the middleware 330 may dynamically remove a part of the preexisting components or may add new components thereto.

The API 360 (e.g., the API 145) may be, for example, a set of programming functions and may be provided with a configuration that is variable depending on an OS. For example, in the case where an OS is Androidor or iOS, it may provide one API set per platform. In the case where an OS is Tizen, it may provide two or more API sets per platform.

The application 370 (e.g., the application program 147) may include, for example, one or more applications capable of providing functions for a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a timepiece 384, and a payment 385 or for offering health care (e.g., measuring an exercise quantity, blood sugar, or the like) or environment information (e.g., information of barometric pressure, humidity, temperature, or the like).

According to an embodiment, the application 370 may include an application (hereinafter referred to as "information exchanging application" for descriptive convenience) to support information exchange between an electronic device (e.g., the electronic device 101) and an external electronic device (e.g., the electronic device 102 or 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or 104). Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device (e.g., the electronic device 102 or 104) which communicates with the electronic device, an application running in the external electronic device, or a service (e.g., a call service, a message service, or the like) provided from the external electronic device.

According to an embodiment, the application 370 may include an application (e.g., a health care application of a mobile medical device) that is assigned in accordance with an attribute of an external electronic device (e.g., the electronic device 102 or 104). According to an embodiment, the application 370 may include an application that is received from an external electronic device (e.g., the server 106 or the electronic device 102 or 104). According to an embodiment, the application 370 may include a preloaded application or a third party application that is downloadable from a server. The names of components of the program module 310 according to the embodiment may be modifiable depending on kinds of operating systems.

According to various embodiments, at least a portion of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, processes, or the like for performing one or more functions.

Figure 4:
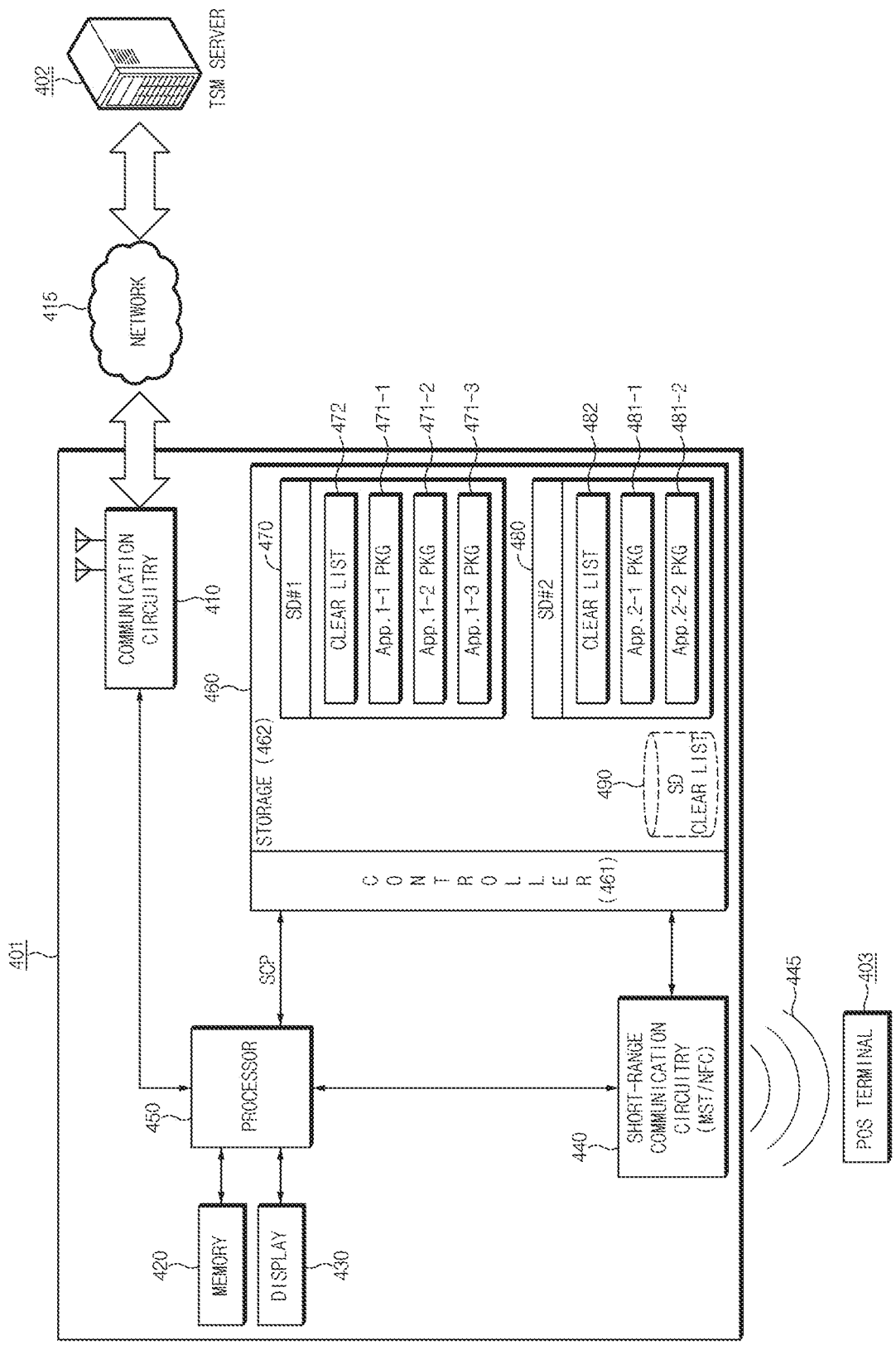
FIG. 4 illustrates a block diagram of an electronic device according to an embodiment.

FIG. 4 illustrates a block diagram of an electronic device according to an embodiment.

Referring to FIG. 4, an electronic device 401 according to an embodiment may include a communication circuitry 410, a memory 420, a display 430, a short-range communication circuitry 440, a processor 450, and/or a secure element 460. According to various embodiments, the electronic device 401 may fail to include some of the components shown in FIG. 4 and may further include a component which is not shown in FIG. 4.

The communication circuitry 410 may access a network 415 to establish wired communication or wireless communication with a TSM server 402 based on a specified protocol.

The memory 420 may store a command, information, a program, or data associated with operations of the components (e.g., the processor 450) included in the electronic device 401. For example, the memory 420 may store a payment application program for performing a payment transaction with a point of sale (POS) terminal 403, a program for performing a factory reset of the electronic device 401, a client application program for communicating with the trusted service manager (TSM) server 402, or the like.

Furthermore, the memory 420 may store instructions, when executed, causing the processor 450 or a controller 461 to perform various operations described in disclosure. The instructions may be implemented with software, for example, an application program, an OS, or firmware.

The display 430 may display a variety of content (e.g., a text, an image, a video, an icon, an object, a symbol, or the like) under control of the processor 450. The display 430 may include a touch screen and may receive, for example, a touch, a gesture, proximity, or a hovering input using an electronic pen or a part of a user's body. According to an embodiment, a graphic user interface (UI) based on a variety of software (e.g., an OS, an application, and the like) may be output on the display 430, and a user input may be obtained through the graphic UI.

The short-range communication circuitry 440 may wirelessly transmit data for a payment transaction or the like to the POS terminal 403. For example, the short-range communication circuitry 440 may include an MST module, an NFC module, an RFID module, or the like. When the data for the payment transaction is transmitted to the POS terminal 403 in the form of a magnetic field, an electromagnetic field, or the like 445, the POS terminal 403 may complete the corresponding payment transaction by interacting with a mobile payment service server, a financial institution server, and the like for each transaction.

Unlike being shown in FIG. 4, the short-range communication circuitry 440 may be implemented as a dedicated device (or an accessory) and may be electrically combined with the electronic device 401 via a specified interface (e.g., a 3.5 mm earphone port, a USB port, or the like).

The processor 450 (e.g., a processor 210 of FIG. 2) may be electrically connected with, for example, the components 410 to 460 included in the electronic device 401. The processor 450 may execute calculation or data processing about control and/or communication of the components 410 to 460 included in the electronic device 401.

According to an embodiment, the processor 450 may receive or download at least one application package (e.g., 471-1, 471-2, 471-3, 481-1, or 481-2) from the at least one TSM server 402 via the communication circuitry 410. The at least one received application package (e.g., 471-1, 471-2, 471-3, 481-1, or 481-2) may be installed in the secure element 460 (a storage 462 of the secure element 460).

According to an embodiment, the application package (e.g., 471-1, 471-2, 471-3, 481-1, or 481-2) may include information associated with a payment card. The information associated with the payment card may be used for a payment transaction with the POS terminal 403 via the short-range communication circuitry 440. For example, the information associated with the payment card may include at least one of a primary account number (PAN), at least a part of which is encrypted, an expiration date, a CVV number, or a name of a card owner.

According to an embodiment, the application packages 471-1, 471-2, 471-3, 481-1, and 481-2 may be installed (or stored) in different secure domains (SD) depending on the TSM server 402 which provides the application packages 471-1, 471-2, 471-3, 481-1, and 481-2. For example, the application packages 471-1, 471-2, and 471-3 downloaded from TSM server #1 may be stored in SD #1 470 associated with TSM server #1. The application packages 481-1 and 481-2 downloaded from TSM server #2 may be stored in SD #2 480 associated with TSM server #2.

When the application package (e.g., 471-1, 471-2, 471-3, 481-1, or 481-2) is installed or stored in the secure element 460, a list (e.g., 472 or 482) with which a part or all of identification information of the at least one application package (e.g., 471-1, 471-2, 471-3, 481-1, or 481-2) is registered may be stored in the secure element 460 (the storage 460 of the secure element 460).

The identification information registered with the list (e.g., 472 or 482) may correspond to identification information of an application package to be uninstalled from the secure element 460 in response to a specified event. According to various embodiments, the identification information registered with the list (e.g., 472 or 482) may include identification information of various types of data, such as an execution load file (ELF), a package file, an SD, or an instance, capable of being stored in an SE.

The list (e.g., 472 or 482) may be interchangeably referred to as a clear list in the disclosure.

According to an embodiment, the list (e.g., 472 or 482) may be stored per SD corresponding to the TSM server 402. For example, the clear list 472 may be stored in SD #1 470 managed by TSM server #1, and the clear list 482 may be stored in SD #2 480 managed by TSM server #2.

According to an embodiment, the processor 450 may manage the clear list (e.g., 472 or 482) based on interaction (e.g., encryption communication) with the TSM server 402. For example, the processor 450 may manage the clear list 472 based on interaction with TSM server #1 and may manage the clear list 482 based on interaction with TSM server #2. In detail, the processor 450 may provide a control message associated with managing the clear list (e.g., 472 or 482) to the controller 461 of the secure element 460. The controller 461 may add, remove, or retrieve identification information of the clear list (e.g., 472 or 482) depending on the control message.

For example, identification information of the application package 1-1 471-1, the application package 1-2 471-2, and the application package 1-3 471-3 may be registered with the clear list 472 included in SD #1 470. In this case, the processor 450 may remove the identification information of the application package 1-1 471-1 from the clear list 472 based on interaction with TSM server #1.

As described above, under control of the processor 450, the clear list (e.g., 472 or 482) may be stored in the secure element (e.g., 470 or 480) in the storage 462 of the secure element 460. The processor 450 may uninstall an application package without communication with the TSM server 402 depending on a manner described below.

According to an embodiment, the processor 450 may control the secure element 460 such that an application package indicated by identification information registered with the clear list (e.g., 472 or 482) is uninstalled, in response to a specified event. According to an embodiment, the specified event may include a user input which causes a factory reset of the electronic device 401. The factory reset may indicate removal of all programs, data, information, or the like stored in the memory 420, the secure element 462, and the like after product shipment.

For example, the processor 450 may provide a specified control message to the controller 461 of the secure element 460 in response to the specified event. As the specified control message is received, the controller 461 may uninstall an application package indicated by identification information registered with the clear list (e.g., 472 or 482) of each secure domain 470 or 480. The uninstalling may include, for example, removing the application package indicated by the identification information registered with the clear list (e.g., 472 or 482) and removing the corresponding clear list (e.g., 472 or 482).

The secure element 460 may be implemented as, for example, an embedded SE (eSE), a universal IC card (UICC), an embedded UICC (eUICC), a micro secure digital (SD) card, a subscriber identification module (SIM) card, a trust zone which is a memory securely protected from unauthorized access, or the like. The secure element 460 may communicate with the processor 450 based on a secure channel protocol (SCP). According to an embodiment, the secure element 460 may include the controller 461 and the storage 462.

The controller 461 may communicate with the processor 450 based on the SCP, and may determine a location where data or the like to be stored in the storage 462 is stored or may execute a chip OS stored in the storage 462 and another application (e.g., a factory rest application (FRA) or the like described below). The controller 461 may include a circuitry for reading/writing data or the like in the storage 462.

The storage 462 may include a nonvolatile memory and/or a volatile memory. For example, the storage 462 may include SD #1 470 including the application package (e.g., 471-1, 471-2, or 471-3) and the clear list 472 and SD #2 480 including the application package 481-1 or 481-2 and the clear list 482. When the application package (e.g., 471-1, 471-2, 471-3, 481-1, or 481-2) is implemented with Java™ language, it may be referred to as an applet.

Only the two secure elements are shown in FIG. 2, but only a single secure domain may be included in the storage 462 or three or more secure domains may be included in the storage 462. Furthermore, each secure domain may include a single application package or may include four or more application packages.

According to various embodiments, a secure domain clear list 490 may be further stored in the storage 462. When there is no the secure domain clear list 490, the controller 461 may refer to the clear lists (e.g., 472 and 482) included in all the secure domains (e.g., 470 and 480), in response to a control message from the processor 450. Furthermore, the controller 461 may sequentially perform an uninstall process for each secure domain (e.g., 470 or 480).

On the other word, when there is the secure domain clear list 490, the controller 461 may refer to the secure domain clear list 490 in response to a control message from the processor 450. Furthermore, the controller 461 may perform an uninstall process only for the secure domain (e.g., 470 or 480) specified by the secure domain clear list 490 or may perform an uninstall process for a specified application package (e.g., at least one of 471-1 to 481-2). According to an embodiment, there may be the secure domain clear list 490 in the storage 462 or there may be no separate clear list in each secure domain (e.g., 470 or 480).

According to an embodiment, although not shown in FIG. 4, software defining an operation of the controller 461 may be stored in the storage 462. For example, a clear list manager application, a reset application, a chip operating system, or the like, which operates based on a computing resource of the controller 462, may be stored in the storage 462 (in detail, refer to FIGS. 5 and 6).

The POS terminal 402 may complete a transaction based on information (or data) associated with a payment transaction, received from the short-range communication circuitry 440 of the electronic device 401. For example, the POS terminal 402 may complete a payment transaction by interacting with a mobile payment service server and a payment server of a card company and/or a financial institution over an external network (e.g., a POS system network, the Internet, or the like).

The POS terminal 402 may have a receive module corresponding to the short-range communication circuitry 440, for communication with the short-range communication circuitry 440. For example, the POS terminal 402 may include an NFC reader, a magnetic stripe reader or a magnetic secure reader (MSR), or an RFID tag reader. In FIG. 4, the POS terminal 402 is exemplified as, but not limited to, the device which performs a payment transaction with the electronic device 401. For example, the device which performs the payment transaction with the electronic device 401 may include an ATM of a financial institution or an electronic device capable of performing peer-to-peer payment or peer-to-peer remittance.

Figure 5:
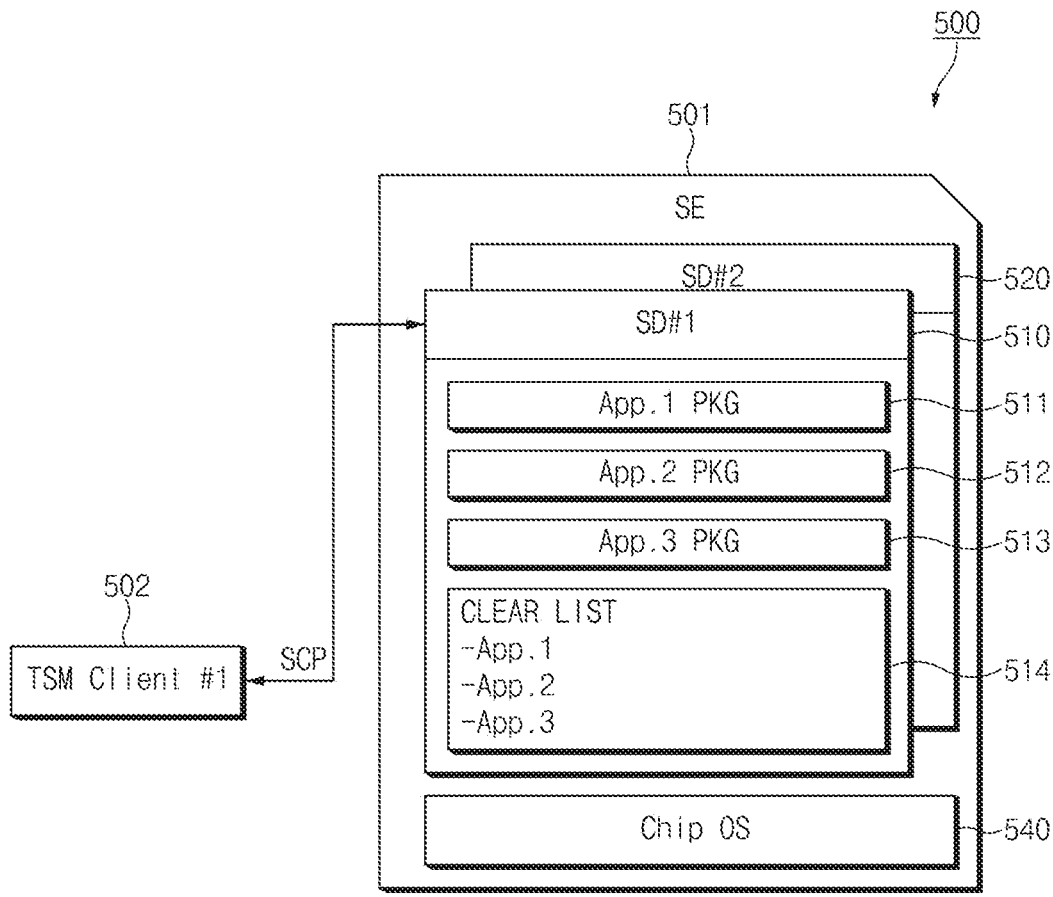
FIG. 5 is a drawing illustrating generating and managing a clear list according to an embodiment.

FIG. 5 is a drawing illustrating generating and managing a clear list according to an embodiment.

Referring to FIG. 5, an electronic device 500 according to an embodiment may include a secure element 501 and application TSM client #1 502 (hereinafter referred to as "TSM client #1"), which communicates with the secure element 501 based on an SCP.

The secure element 501 may include (or store) secure domain #1 510, secure domain #2 520, and a chip operating system 540. The chip operating system 540 may be a software module and may operate based on a computing resource of a controller included in the secure element 501. Thus, the operation of the chip operating system 540 may be understood as an operation of the secure element 501 or the controller included in the secure element 501.

A secure domain 510 or 520 may correspond to, for example, a secure domain 470 or 480 shown in FIG. 4. As an example, secure domain #1 510 may include a first application package 511, a second application package 512, a third application package 513, and a clear list 514.

TSM client #1 502 may be a software module implemented by a computing resource of a processor (e.g., 450 of FIG. 4) of the electronic device 500 and may be stored in a memory (e.g., 420 of FIG. 4) of the electronic device 500.

Thus, the operation of TSM client #1 502 may be understood as an operation of the processor.

According to an embodiment, TSM client #1 502 may download (or receive) application packages 511, 512, and 513 from TSM server #1 (not shown) corresponding to TSM client #1 502. TSM client #1 502 may generate secure domain #1 510 corresponding to TSM client #1 502 in the secure element 501 and may install (or store) the received packages 511, 512, and 513 in secure domain #1 510.

According to an embodiment, when installing the received packages 511, 512, and 513 in secure domain #1 510, TSM client #1 502 may generate the clear list 514 and may store the clear list 514 in secure domain #1 510. Identification information of an application package to be uninstalled from the secure element 501, when a specified event occurs, may be registered with the clear list 514. For example, in FIG. 5, identification information of the first application package 511, the second application package 512, and the third application package 513 may be registered with the clear list 514. Thus, when the specified event occurs, the application packages 511, 512, and 513 may be uninstalled.

According to various embodiments, TSM client #1 502 may manage the client 514 based on interaction with TSM server #1. For example, TSM client #1 502 may retrieve, add, remove, or modify details registered with the clear list 514 through interaction with TSM server #1. For example, the chip operating system 540 may remove identification information of the first application package 511 from the clear list 514 depending on the request. Thus, when the specified event occurs, the first application package 511 may fail to be uninstalled to remain.

Figure 6:
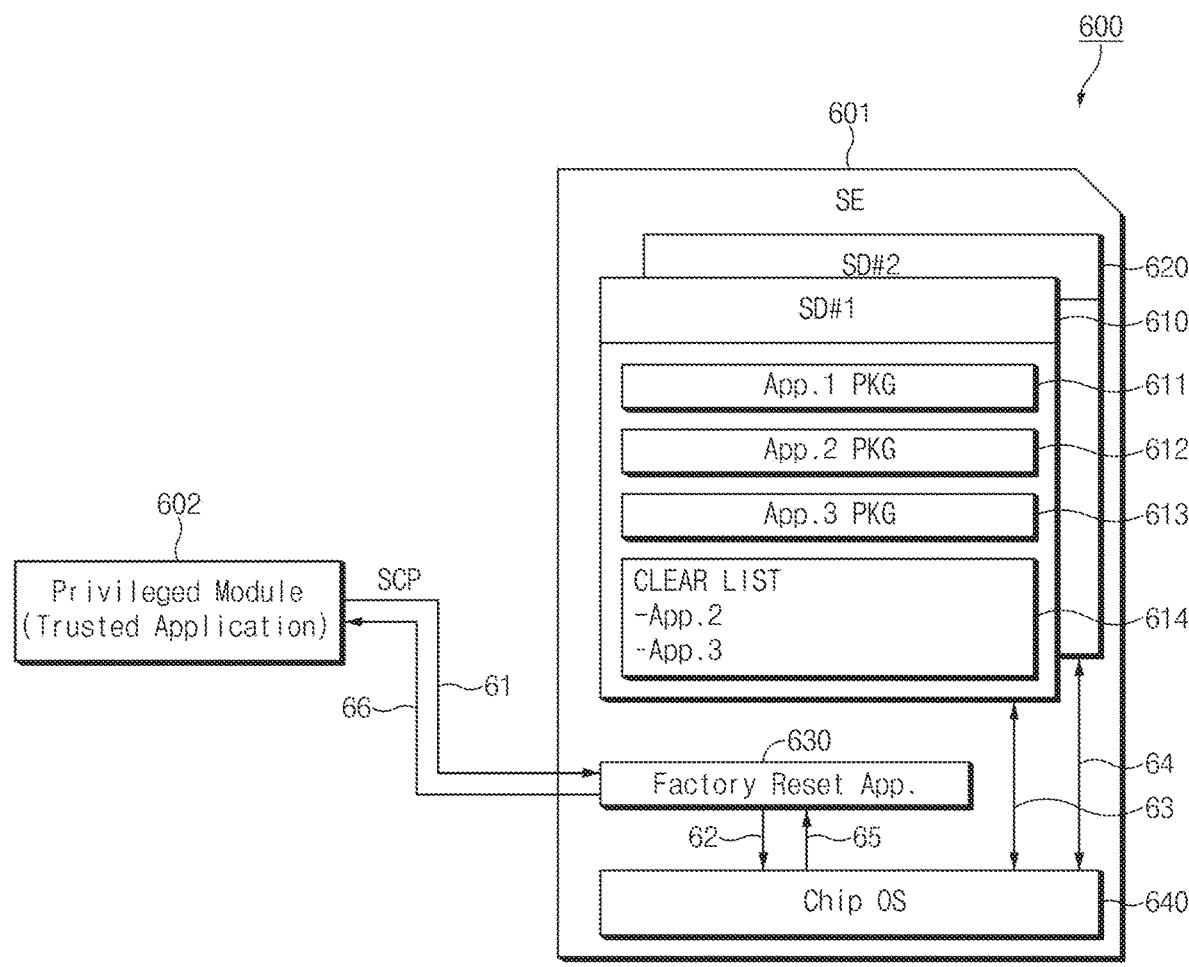
FIG. 6 is a drawing illustrating a factory reset of a secure element according to an embodiment.

FIG. 6 is a drawing illustrating a factory reset of a secure element according to an embodiment.

Referring to FIG. 6, an electronic device 600 according to an embodiment may include a secure element 601 and a module 602 (a so-called factory reset privileged module: hereinafter referred to as "privileged module") having the right to perform a factory reset of the secure element 601. The privileged module 602 may be a trusted application conforming to an SCP with the secure element 601.

The secure element 601 may include (or store) secure domain #1 610, secure domain #2 620, a factory reset application (FRA) 630, and a chip operating system 640. The FRA 630 and the chip operating system 640 may be software modules and may operate based on a computing resource of a controller included in the secure element 601. Thus, the operation of the FRA 630 and the chip operating system 640 may be understood as an operation of the secure element 601 or the controller included in the secure element 601. According to various embodiments, the FRA 630 may be referred to as "reset application".

For example, secure domain #1 610 may include a first application package 611, a second application package 612, a third application package 613, and a clear list 614. Identification information of the second application package 612 and the third application package 613 may be registered, as identification information of an application package to be uninstalled from the secure element 601 when a specified event occurs, with the clear list 614.

The privileged module 602 may be a software module implemented by a computing resource of a processor of the electronic device 600 and may be stored in a memory of the electronic device 600. Thus, the operation of the privileged module 602 may be understood as an operation of the processor.

According to an embodiment, the privileged module 602 may provide a specified control message to the FRA 630 in response to the specified event (operation 61). For example, the specified event may include an event which causes a factory reset of the electronic device 600. The event may correspond to a user input through a GUI output on a display.

Receiving the specified control message, the FRA 630 may provide a message or request corresponding to the specified control message to the chip operating system 640 (operation 62). The chip operating system 640 may uninstall an application package indicated by identification information registered with each clear list, with reference to clear lists included in all the secure domains (e.g., 610 and 620) (operations 63 and 64).

According to an embodiment, because identification information of the first application package 611 and the second application package 612 is registered with a clear list 614 included in secure domain #1 610, the chip operating system 640 may uninstall the first application package 611 and the second application package 612. Because identification information of the third application package 613 is not registered with the clear list 614, the third application 613 may remain without change (operation 63).

Furthermore, identification information of all applications installed in secure domain #2 620 may be registered with a clear list of secure domain #2 620. Thus, the chip operating system 640 may uninstall all the applications installed in secure domain #2 620. The chip operating system 640 may remove all the applications installed in secure domain #2 and may remove the corresponding clear list and the corresponding secure domain #2 620 itself (operation 64).

When the uninstalling is completed, the chip operating system 640 may transmit a reset completion response to the FRA 630 (operation 65). Furthermore, when the uninstalling is completed, the FRA 630 may provide a reset completion message to the privileged module 602 through an SCP (operation 66).

Figure 7:
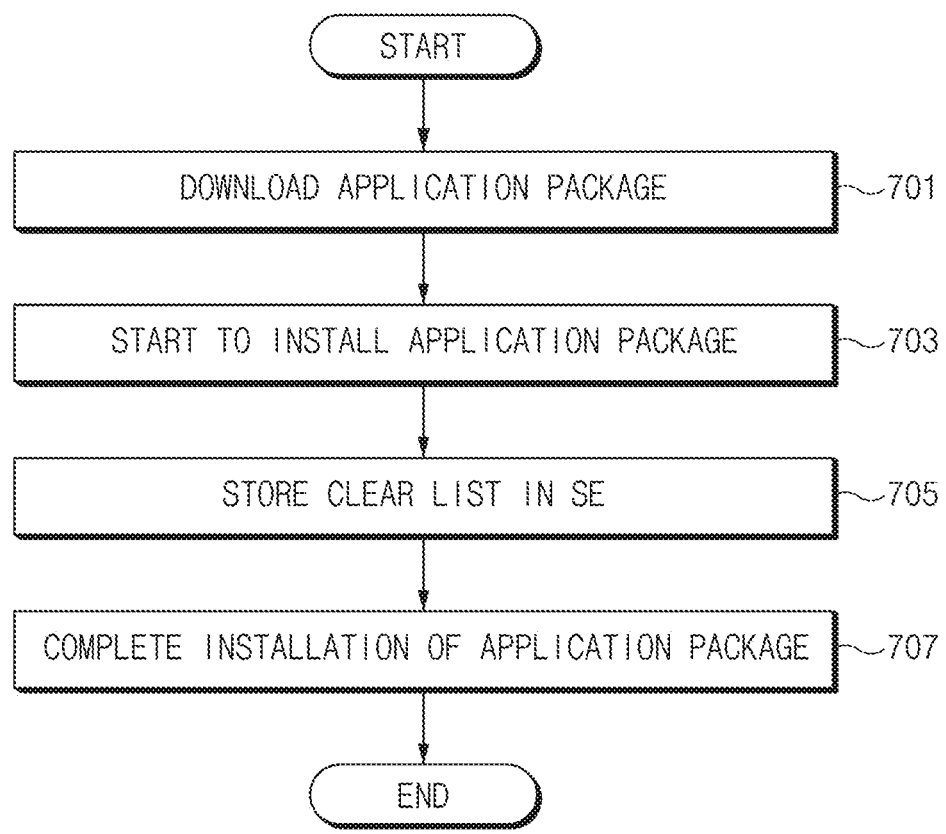
FIG. 7 is a flowchart illustrating a method for generating a clear list according to an embodiment.

FIG. 7 is a flowchart illustrating a method for generating a clear list according to an embodiment.

Referring to FIG. 7, the method for generating the clear list according to an embodiment may include operations 701 to 707. Operations 701 to 707 may be performed by, for example, an electronic device 401 shown in FIG. 4. Each of operations 701 to 707 may be implemented as, for example, instructions capable of being performed (or executed) by a processor 450 or a controller 461 of the electronic device 401. Hereinafter, reference denotations of FIG. 4 are used to describe operations 701 to 707.

In operation 701, the processor 450 of the electronic device 401 may receive or download at least one application package from at least one TSM server 402 via a communication circuitry 410.

In operation 703, the processor 450 may start to install the application package received in operation 701. According to an embodiment, the application package may be installed (or stored) in a secure domain corresponding to the TSM server 402 which provides the corresponding application package.

In operation 705, the processor 450 may generate and store a clear list in a secure domain corresponding to the TSM server 402 in a storage 462 of a secure element 460. For example, a part or all of identification information of at least one application package received in operation 701 may be registered with the clear list. The identification information registered with the clear list may correspond to identification information of an application package to be uninstalled from the secure element 460 in response to a specified event.

In operation 707, the installation of the application package may be completed. According to various embodiments, after the installation of the application package is completed, the processor 450 may manage the clear list based on interaction with the TSM server 402.

Figure 8:
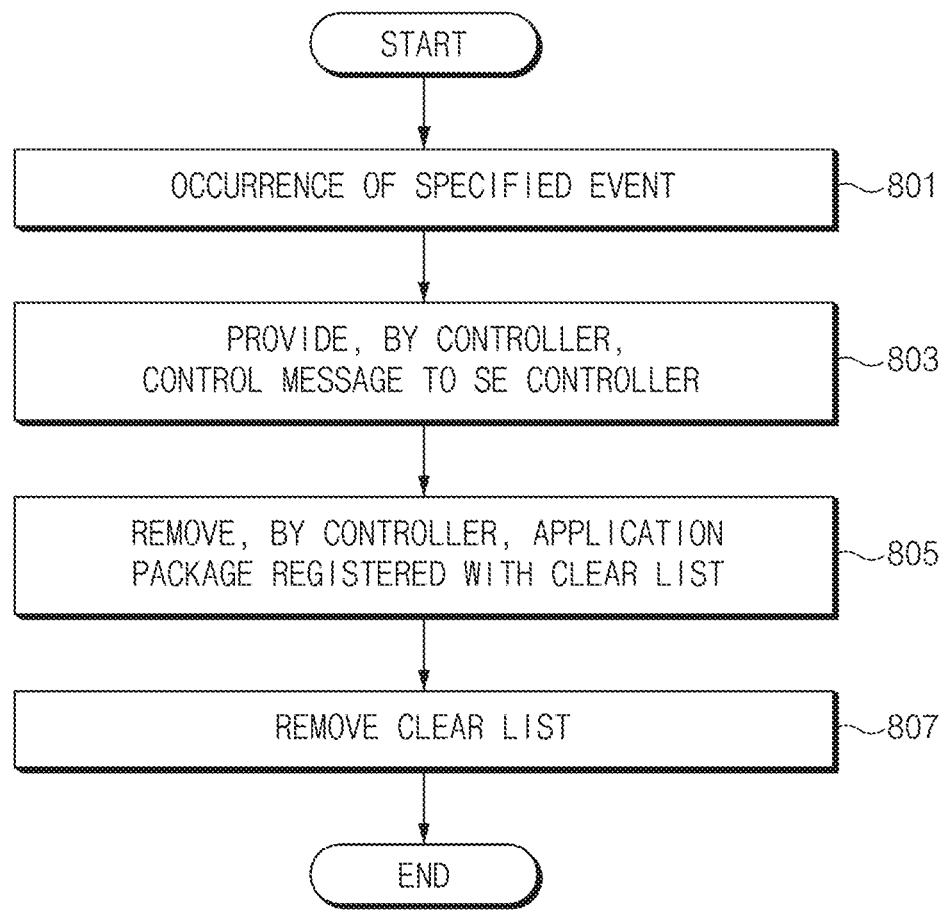
FIG. 8 is a flowchart illustrating a method for performing a factory reset of a secure element according to an embodiment.

FIG. 8 is a flowchart illustrating a method for performing a factory reset of a secure element according to an embodiment.

Referring to FIG. 8, the method for performing the factory reset of the secure element according to an embodiment may include operations 801 to 807. Operations 801 to 807 may be performed by, for example, an electronic device 401 shown in FIG. 4. Each of operations 801 to 807 may be implemented as, for example, instructions capable of being performed (or executed) by a processor 450 or a controller 461 of the electronic device 401. Hereinafter, reference denotations of FIG. 4 are used to describe operations 801 to 807.

In operation 801, a specified event may occur. For example, the specified event may include a user input which causes a factory reset of the electronic device 401.

In operation 803, the processor 450 of the electronic device 401 may provide a specified control message to the controller 461 of a secure element 460 in response to the specified event. The specified control message may be provided from the processor 450 to the controller 461 through communication based on an SCP.

In operation 805, the controller 461 of the secure element 460 may uninstall an application package indicated by identification information registered with a clear list, with reference to the clear list included in each secure domain. According to various embodiments, when there is a secure domain clear list 490, the controller 461 may specify a secure domain to apply an uninstall process, with reference to the secure domain clear list 490.

In operation 807, the controller 461 of the secure element 460 may remove the clear list. Herein, when an application package which is not registered with the clear list remains in the corresponding secure domain, the clear list may also not be removed to remain.

Figure 9:
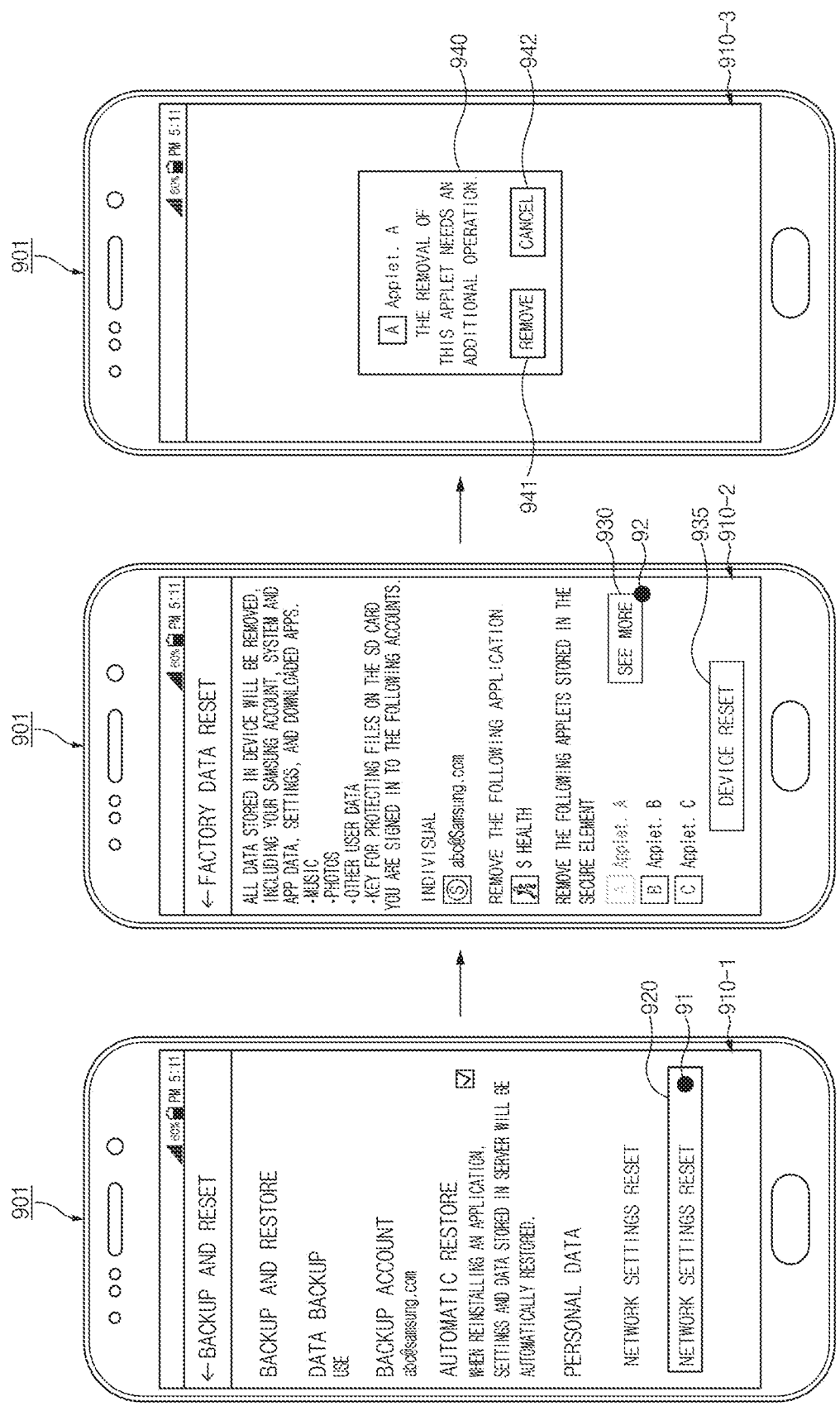
FIG. 9 illustrates a GUI for describing a device reset (factory reset) according to an embodiment.

FIG. 9 illustrates a GUI for describing a device reset (factory reset) according to an embodiment.

Referring to FIG. 9, GUI screens 910-1, 910-2, and 910-3 output on a display of an electronic device 901 according to an embodiment are shown. The GUI screens 910-1, 910-2, and 910-3 may be, for example, screens output based on an operating system of the electronic device 901.

According to an embodiment, the screen 910-1 may correspond to a screen corresponding to a "backup and reset" menu among setting menus. For example, a user may select (91) an object 920 associated with a "factory data reset" due to various causes (e.g., dealing in used articles or the like). The selection 91 by the user may include a touch using, for example, a part of a user's body or an electronic pen. The electronic device 901 may output the screen 910-2 in response to the selection 91 of the object 920.

Referring to the screen 910-2 according to an embodiment, the electronic device 901 may output an information message associated with the "factory data reset" and items to be removed by the "factory data reset" on its display. For example, the items to be removed by the "factory data reset" may include a user account (e.g., "abc@samsung.com"), various installed application programs (e.g., "S health"), and applets (e.g., applet A, applet B, and applet C) stored in a secure element. When the user wants to execute, for example, the "factory data reset", he or she may select an object 935.

According to an embodiment, the electronic device 901 may uninstall or remove the above-mentioned various items in response to the selection of the object 935. For example, applets B and C may be removed without communication with the corresponding TSM server, in response to the selection of the object 935. That is, a clear list with which identification information of applets B and C is registered may be included in secure elements respectively including applets B and C.

On the other hand, applet A may fail to be immediately removed in response to the selection of the object 935. This is because identification information of applet A is not registered with a clear list of a secure domain including applet A. Thus, to remove applet A, there may be a need for communication with a TSM server associated with applet A.

According to an embodiment, to remove applet A, the user select (92) a "see more" object 930 included in the screen 910-2. The electronic device 901 may output the screen 910-3 in response to the selection 92.

An information message 940 for uninstalling or removing applet A may be output on the screen 910-3 according to an embodiment. As described above, the identification information of applet A may fail to be registered with the clear list of the secure domain including applet A. Thus, to uninstall or remove applet A, there may be a need for communication with a TSM server associated with the secure domain including applet A.

For example, when the user selects an object 941 for removing applet A, the electronic device 901 may perform specified encryption communication with the TSM server associated with the secure element including applet A and may remove applet A based on it. On the other hand, when the user does not want to remove applet A, he or she may select an object 942. The electronic device 901 may output the screen 910-2 again in response to the selection of the object 942.

According to various embodiments of the disclosure, the electronic device may collectively remove various data in a secure element without communication with a server by using a clear list. As a result, a time taken to remove all of data stored in the secure element (i.e., perform a factory reset of the secure element) and communication traffic may be reduced. Because the clear list is able to be managed by a TSM (add, modify, remove, retrieve, or the like an item registered with the clear list), the factory reset of the secure element may be smoothly managed according to a policy of the TSM.

An electronic device according to an embodiment may include a processor, a communication circuitry for establishing communication with a server, and a secure element. The processor may receive at least one application package from the server via the communication circuitry and may install the at least one application package in the secure element. Furthermore, the processor may store a list with which a part or all of identification information of the at least one application package is registered in the secure element.

According to an embodiment, identification information of an application package to be uninstalled from the secure element in response to a specified event may be registered with the list.

According to an embodiment, the at least one application package and the list may be stored in a secure domain included in the secure element.

According to an embodiment, the secure domain may be associated with or correspond to the server. The at least one application package may be received from a server corresponding to the secure domain based on encryption communication.

According to an embodiment, the server may be a TSM server.

According to an embodiment, the processor may manage the identification information registered with the list based on interaction with the server.

According to an embodiment, the secure element may include a storage and a controller for the storage. The processor may provide a control message associated with managing the list to the controller. The controller may add, remove, or retrieve identification information of the list stored in the storage depending on the control message.

According to an embodiment, the processor may communicate with the secure element based on an SCP.

According to an embodiment, the application package may include information associated with a payment card.

According to an embodiment, the information associated with the payment card may include at least one of a primary account number (PAN), at least a part of which is encrypted, an expiration date, a CVV number, or a name of a card owner.

An electronic device according to an embodiment may include a secure element in which at least one application package is installed and a processor for communicating with the secure element. The secure element may further store a list with which a part or all of identification information of the at least one application package is registered. The processor may control the secure element such that an application package indicated by the identification information registered with the list is uninstalled, in response to a specified event.

According to an embodiment, the specified event may be an event which causes a reset of the electronic device.

According to an embodiment, the uninstalling of the application package indicated by the identification information registered with the list may include removing the application package indicated by the identification information registered with the list and removing the list.

According to an embodiment, the at least one application package and the list may be stored in a secure domain included in the secure element.

According to an embodiment, the processor may communicate with the secure element based on an SCP.

According to an embodiment, the secure element may include at least one of an eSE, a UICC, an eUICC, a micro SD card, a SIM card, or a trust zone.

According to an embodiment, the secure element may include a storage for storing the at least one application package and the list and a controller for the storage. The processor may provide a specified control message to the controller in response to the specified event. When the specified control message is received, the controller may uninstall an application package indicated by identification information registered with the list.

According to an embodiment, the secure element may include a storage and a controller for the storage. The storage may include a reset application for operating based on a computing resource of the controller, a chip operating system for operating based on the computing resource of the controller, and a secure domain including the at least one application package and the list. The processor may provide a specified control message to the reset application in response to the specified event. The reset application may provide a message corresponding to the specified control message to the chip operating system. The chip operating system may uninstall an application package indicated by identification information registered with the list.

According to an embodiment, the chip operating system may remove the application package indicated by the identification information registered with the list and may remove the list.

According to an embodiment, the processor may provide the specified control message to the reset application using a trusted application conforming to an SCP.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa. [1] A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a processor;
   a communication circuitry configured to establish communication with a server;
   a secure element; and at least one memory storing one or more computer programs including instructions configured to be executed by the processor, wherein the instructions, when executed by the processor, cause the processor to:

receive at least one application package from the server via the communication circuitry, install the at least one application package in the secure element, while installing the at least one application package, store, in the secure element, a list comprising identification information of the at least one application package to be factory reset from the secure element in response to a specified event, a part or all of the identification information of the at least one application package being registered with the list, in response to the specified event, control the secure element such that an application package indicated by the identification information registered with the list is factory reset, and uninstall the application package indicated by the identification information registered with the list by removing the application package indicated by the identification information registered with the list and removing the list.

2. The electronic device of claim 1, wherein the specified event comprises an event which causes a factory reset of the electronic device.

3. The electronic device of claim 1, wherein the at least one application package and the list are stored in a secure domain included in the secure element.

4. The electronic device of claim 3, wherein the at least one application package is received from the server corresponding to the secure domain based on encryption communication.

5. The electronic device of claim 1, wherein the server comprises a trusted service manager (TSM) server.

6. The electronic device of claim 1, wherein the processor, when executing the instructions, is further configured to manage the identification information registered with the list based on interactions with the server.

7. The electronic device of claim 6,
wherein the secure element comprises:
a storage, and
a controller configured to control the storage,
wherein the processor, when executing the instructions, is further configured to provide a control message associated with managing the list to the controller, and
wherein the controller is further configured to add, remove, or retrieve identification information of the list stored in the storage depending on the control message.

8. The electronic device of claim 1, wherein the processor, when executing the instructions, is further configured to communicate with the secure element based on a secure channel protocol (SCP).

9. The electronic device of claim 1, wherein the at least one application package includes information associated with a payment card.

10. The electronic device of claim 9, wherein the information associated with the payment card includes at least one of a primary account number (PAN), at least a part of which is encrypted, an expiration date, a card verification value (CVV) number, or a name of a card owner.

11. The electronic device of claim 1, wherein the processor, when executing the instructions, is further configured to, after the list is stored in the secure element, complete the installing of the at least one application package in the secure element.

12. An electronic device, comprising:
a secure element;
a processor; and
at least one memory storing one or more computer programs including instructions configured to be executed by the processor, wherein the instructions, when executed by the processor, cause the processor to:

communicate with the secure element, install at least one application package in the secure element, while installing the at least one application package, store, in the secure element, a list comprising identification information of the at least one application package, a part or all of the identification information of the at least one application package being registered with the list, in response to a specified event, control the secure element such that an application package indicated by the identification information registered with the list is factory reset, and uninstall the application package indicated by the identification information registered with the list by removing the application package indicated by the identification information registered with the list and removing the list.

13. The electronic device of claim 12, wherein the specified event comprises an event which causes a factory reset of the electronic device.

14. The electronic device of claim 12, wherein the at least one application package and the list are stored in a secure domain included in the secure element.

15. The electronic device of claim 12, wherein the processor, when executing the instructions, is further configured to communicate with the secure element based on a secure channel protocol (SCP).

* * * * *